United States Patent Office 3,306,655
Patented Feb. 28, 1967

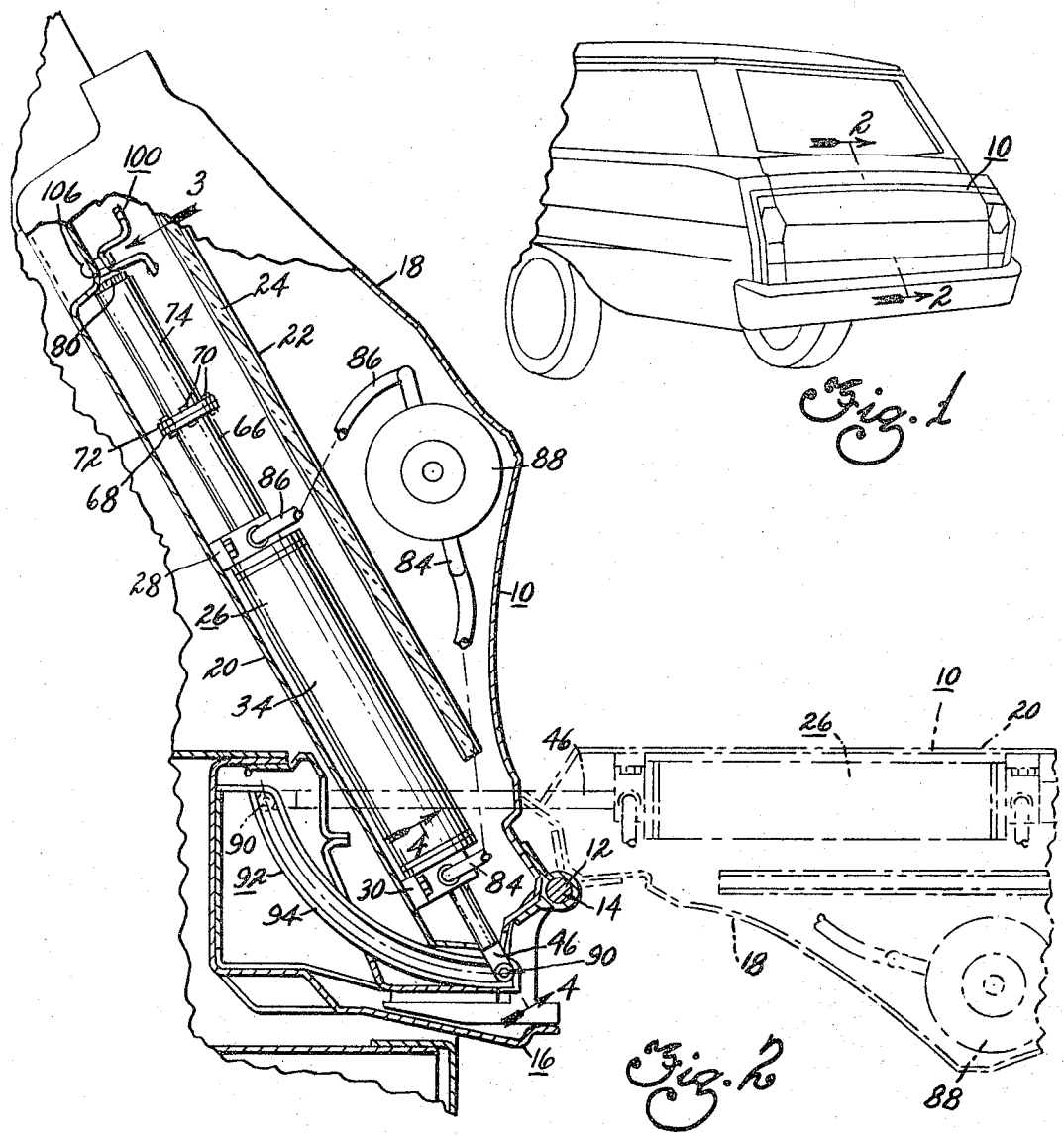

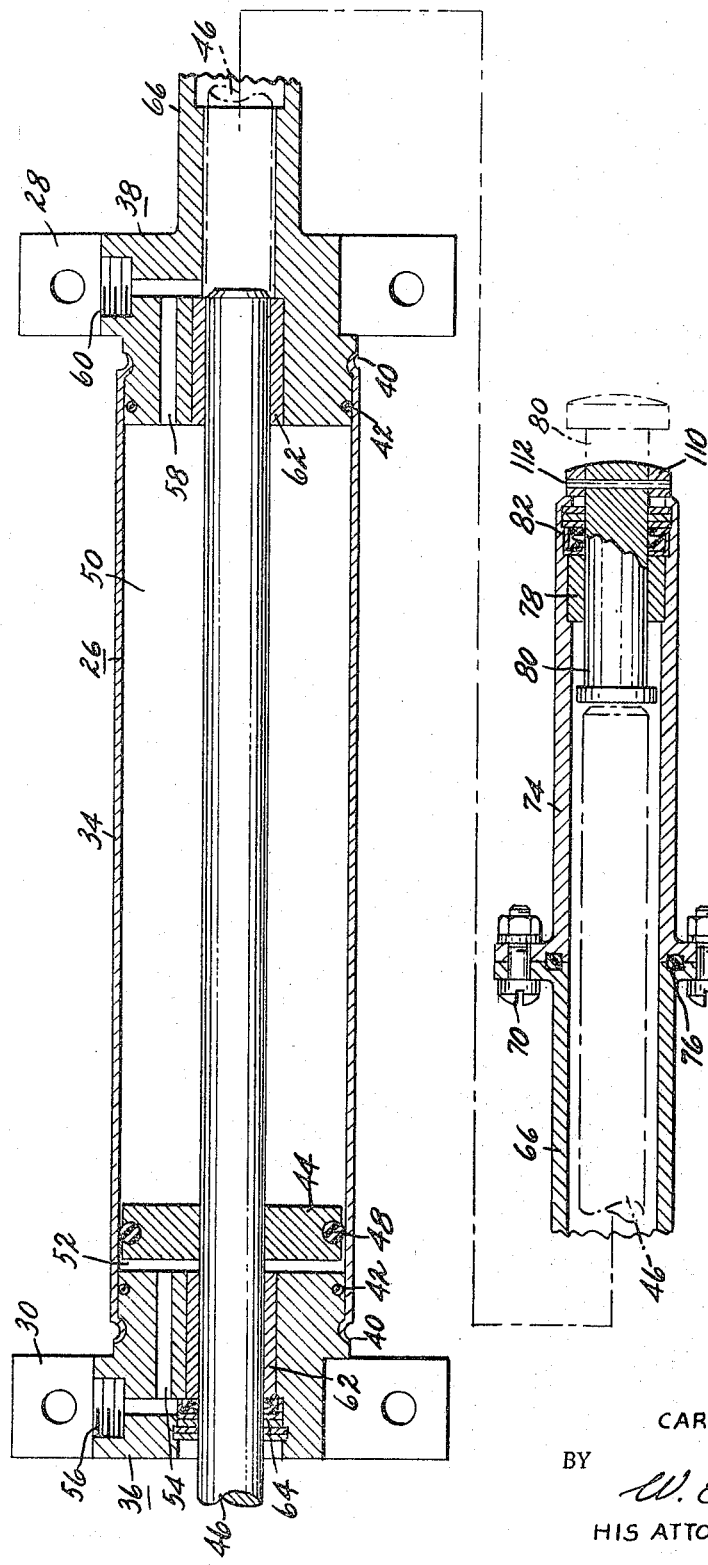

3,306,655
VEHICLE TAILGATE ACTUATOR
Carl Voehringer, Rochester, N.Y., assignor to General Motors Corporation, Detroit, Mich., a corporation of Delaware
Filed June 17, 1964, Ser. No. 375,813
5 Claims. (Cl. 296—57)

This invention pertains to motor vehicles, and particularly to actuating mechanism for a swingable tailgate on a motor vehicle of the station wagon type.

At the present time the tailgate structures of station wagon-type vehicles, which are swingable upon a substantially horizontal axis between open and closed positions, must be manually unlatched and manually operated. The present invention relates to a hydraulically operated actuator which can be remotely controlled to both unlatch the tailgate and also move it between open and closed positions.

Accordingly, among my objects are the provision of actuating mechanism for moving a tailgate between open and closed positions; the further provision of hydraulically operated actuating mechanism capable of unlatching a vehicle tailgate and moving it between open and closed positions; and the still further provision of actuating mechanism of the aforesaid type including piston and cylinder means connected in a closed loop hydraulic system with a motor actuated reversible pump and including cam means for deriving a torque to swing the tailgate about its horizontal hinged axis.

The aforementioned and other objects are accomplished in the present invention by utilizing a linear actuator of the piston and cylinder type wherein the rod of the piston coacts with a stationary cam which is offset from the hinge axis of the tailgate so as to develop a torque for opening or closing the tailgate dependent upon the direction of hydraulic flow in the system.

Further objects and advantages of the present invention will be apparent from the following description, reference being had to the accompanying drawings, wherein a preferred form of the present invention is clearly shown.

In the drawings:

FIGURE 1 is a fragmentary perspective view of a station wagon-type vehicle having the tailgate actuating mechanism of the present invention.

FIGURE 2 is an enlarged fragmentary view, partly in section and partly in elevation, with the tailgate shown in the closed position in full lines and in the open position in phantom.

FIGURE 3 is a fragmentary view, in elevation, taken in the direction of arrow 3 in FIGURE 2.

FIGURE 4 is a fragmentary view, taken along line 4—4 of FIGURE 3.

FIGURE 5 is a longitudinal sectional view of the hydraulic actuator.

Referring to the drawings, a station wagon-type motor vehicle is shown having a tailgate structure 10 which is mounted for swinging movement about a substantially horizontal hinge axis 12. The hinge structure includes an elongate hinge pin 14 which interconnects hinge parts attached to the tailgate 10 and hinge parts attached to the vehicle body structure 16.

The tailgate 10 includes an outer panel 18 and an inner panel 20 as well as guide channels 22 disposed between the inner and outer panels for receiving a vertically movable rear window 24. A hydraulically operated piston and cylinder type actuator 26 is mounted within the tailgate structure by spaced brackets 28 and 30.

Referring to FIGURE 5, the hydraulically operated actuator 26 comprises a cylinder 34 having cast end caps 36 and 38 attached to opposite ends thereof by any suitable means such as swaging as indicated by 40. O-ring seals 42 are interposed between the overlapping portions of the end caps and the cylinder wall 34. The cylinder receives a reciprocable piston 44 which is shrunk fit on an elongate piston rod 46 so as to be rigidly connected thereto. The piston 44 carries an O-ring seal 48, and divides the cylinder 34 into an extend chamber 50 and a retract chamber 52. The retract chamber 52 is connected by passage means 54 in the end cap 36 to a retract port 56 therein. The extend chamber is connected by passage means 58 to an extend port 60 in the end cap 38. The piston rod is guided by sleeve bearings 62 in both of the end caps, and the end cap 36 is provided with a suitable packing 64 to prevent the leakage of hydraulic fluid from the retract chamber 52.

The end cap 38 includes an elongate cylinder extension 66 having a flange 68 which is connected by a plurality of bolts 70 to a flange 72 of a cylinder part 74 having a diameter equal to the cylinder extension 66 on the end cap 38. A suitable O-ring seal 76 is interposed between the flanges 68 and 72. The outer end of the cylinder part 74 receives a sleeve bearing 78 for slidably supporting a piston 80, and also carries a suitable packing 82 for preventing the leakage of hydraulic fluid from the cylinder parts 66 and 74. As is apparent from an inspection of FIGURE 5, the interiors of cylinder parts 66 and 74 are connected with the passage means 58 in the end cap 38 and are thus hydraulically connected to the extend port 60.

Referring again to FIGURES 2, 3 and 4, the retract port 56 is connected to a conduit, or tube, 84 and the extend port 60 is connected to a conduit 86. The conduits 84 and 86 connect with a reversible electric motor driven pump unit 88 suitably mounted within the tailgate structure 10. The hydraulic actuator 26 and the reversible pump are connected in a closed loop hydraulic system such that during rotation of the pump in one direction, hydraulic fluid is withdrawn from the extend chamber 50 and supplied to the retract chamber 52, and during rotation of the pump in the opposite direction hydraulic fluid is withdrawn from the retract chamber 52 and supplied to the extend chamber 50.

The end of the piston rod 46 is attached to a transversely extending pin 90 which is received in an arcuate cam track 92 mounted in the vehicle body and offset from the pin axis 90. The stationary cam track 92 comprises a pair of channel-shape members 94 and 96, which, as seen in FIGURE 4, are mounted in spaced relation and face each other so as to define a slot 98 for receiving the piston rod 46.

The piston 80, as seen in FIGURE 3, is engageable with a pivotally mounted latch operator 100. The latch operator comprises a pair of crossed arms 102 and 104 having a central pivot 106 on the tailgate structure 10, with the ends of arm 102 being connected to cross bar latch rods 108. As seen more particularly in FIGURE 5, the latch piston 80 has an annulus 110 attached thereto by a cross pin 112.

Operation of the electric motor driven hydraulically operated tailgate actuator with the tailgate in the closed position as shown in full lines in FIGURE 2 is as follows. When the energizing circuit for the electric motor driven pump is closed to open the tailgate whereby hydraulic fluid is pumped from the retract chamber 52 to the extend chamber 50, the hydraulic fluid flowing through the extend port 60 initially fills the chamber defined by the cylinder parts 66 and 74 to actuate the latch piston 80. It is understood that the latch piston 80 acts against latch member 104 to draw lines 108 inwardly against the spring bias of a conventional station wagon door latch. Such a latch is of a type such as shown in U.S. Patent 1,927,332 to Borden. The latch piston 80 is extended to pivot the cross arms 102 and 104 in the clockwise direction as shown in FIGURE 3 thereby withdrawing the latch rods 108 so as to open the tailgate latch. Thereafter, the piston 44 moves downwardly in FIGURE 1 to the position shown in FIGURE 5, and in so doing the rod 46 is extended. As the rod 46 is extended it follows the cam track 92 thereby developing a torque, which is the product of the axial force on the piston 44 and the perpendicular distance between the axis of the piston rod and the hinge axis 12 of the tailgate 10, to move it from the closed position of FIGURE 2 to the open position. With the tailgate in the open position shown in phantom in FIGURE 2 and the motor driven pump energized for rotation in the opposite direction, hydraulic fluid is pumped from the extend chamber 50 and supplied to retract chamber 52 through port 56 thereby developing a torque in the opposite direction to move the tailgate from the open position to the closed position. The chamber defined by parts 66 and 74 acts as an accumulator for the closed loop hydraulic system during both opening and closing movements of the tailgate.

While the embodiment of the invention as herein disclosed constitutes a preferred form, it is to be understood that other forms might be adopted.

What is claimed is as follows:

1. In a vehicle having a body with a tailgate swingable about a horizontal axis between open and closed positions, latch means carried by said tailgate and engageable with said body for retaining said tailgate in its closed position, latch operating means to release said latch means, hydraulically operated actuator means for swinging said tailgate between its open and closed positions comprising a cylinder attached to said tailgate, a reciprocable piston disposed in said cylinder and dividing said cylinder into an opening chamber and a closing chamber, a rod attached to said piston extending outside of said cylinder, a latch operating piston in said opening chamber and operatively connected with said latch operating means, and an arcuate cam attached to said body and offset from the axis of said tailgate, said piston rod being engageable with said arcuate cam whereby pressurization of said opening chamber of said actuator concurrently causes actuation of said latch piston to actuate said latch operating means and release said latch means and thereafter actuate said reciprocable piston to extend said rod and develop a torque to swing said tailgate from its closed position to its open position.

2. The combination set forth in claim 1 wherein said chambers of said cylinder are connected in a closed loop hydraulic circuit with a reversible motor driven pump.

3. The combination set forth in claim 1 wherein said arcuate cam comprises a pair of spaced channel-shaped members with the channels facing each other, and wherein said rod is connected to a pin seated in said channels.

4. Actuating mechanism for moving a swingable and latchable vehicle tailgate between open and closed positions about its horizontal axis including, a cylinder, reciprocable pistons, one of which is disposed in said cylinder and dividing said cylinder into opposed chambers, and another of said pistons in one of said opposed chambers for unlatching the tailgate before an opening thereof commences, a rod attached to said one piston extending outside of said cylinder, a stationary cam of arcuate configuration offset from said axis, said rod being operatively connected with said cam, and a closed loop hydraulic system connected with said opposed chambers of said cylinder including a motor operated reversible pump.

5. In a vehicle having a body with a tailgate swingable about a horizontal axis between open and closed positions and being latchable at an extreme of movement, hydraulically operated actuator means for moving said tailgate between open and closed positions and unlatching the tailgate; comprising a cylinder attached to said tailgate, a first reciprocable piston disposed in said cylinder and having a rod extending therefrom, said first piston dividing said cylinder into opposed chambers, a motor driven reversible pump connected to said chambers to form a closed loop hydraulic system, a second piston slidably carried in one of said opposed chambers and operable by said second piston initially responding to a pressure buildup in said pump to unlatch the tailgate; and an arcuate cam attached to said vehicle body and offset from the axis of said tailgate, said rod engaging said cam so as to develop a torque for moving said tailgate between its open and closed positions upon movement of said first piston due to operation of said reversible pump.

References Cited by the Examiner
UNITED STATES PATENTS

| | | | |
|---|---|---|---|
| 1,938,502 | 12/1933 | Steindler | 268—3 |
| 2,348,306 | 5/1944 | Parsons | 268—3 |
| 3,022,108 | 2/1962 | Cooley | 296—57 |
| 3,145,988 | 8/1964 | Colautti | 268—3 |

BENJAMIN HERSH, *Primary Examiner.*

J. H. BRANNEN, *Examiner.*